United States Patent
Hong

(10) Patent No.: US 11,317,339 B2
(45) Date of Patent: Apr. 26, 2022

(54) COMMUNICATION CONTROL METHOD AND COMMUNICATION CONTROL DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 85 days.

(21) Appl. No.: 16/839,411

(22) Filed: Apr. 3, 2020

(65) Prior Publication Data

US 2020/0236611 A1 Jul. 23, 2020

Related U.S. Application Data

(63) Continuation of application No. PCT/CN2017/105750, filed on Oct. 11, 2017.

(51) Int. Cl.
| | |
|---|---|
| H04W 48/08 | (2009.01) |
| H04B 1/10 | (2006.01) |
| H04W 48/02 | (2009.01) |
| H04W 72/04 | (2009.01) |
| H04W 72/12 | (2009.01) |

(52) U.S. Cl.
CPC ............ *H04W 48/08* (2013.01); *H04B 1/109* (2013.01); *H04W 48/02* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 6,456,826 | B1 | 9/2002 | Toskala |
| 9,014,735 | B2 | 4/2015 | Kawasaki |
| 9,083,450 | B2 | 7/2015 | Hayase et al. |
| 9,161,369 | B2 | 10/2015 | Kawasaki |

(Continued)

FOREIGN PATENT DOCUMENTS

| | | |
|---|---|---|
| CN | 1406417 A | 3/2003 |
| CN | 1615634 A | 5/2005 |

(Continued)

OTHER PUBLICATIONS

First Office Action of the Chinese application No. 201780001696.1, dated Apr. 2, 2021.

(Continued)

*Primary Examiner* — Hong S Cho
(74) *Attorney, Agent, or Firm* — Syncoda LLC; Feng Ma

(57) ABSTRACT

A method for communication control includes: receiving indication information which is related to uplink transmission denial information and is sent by a first base station; determining a communication resource corresponding to the uplink transmission denial information; and denying transmission of uplink information via the communication resource according to the indication information. As such, indication information related to uplink transmission denial information is received, and a communication resource corresponding to the uplink transmission denial information is determined, and then it is possible to deny transmission of uplink information via the communication resource according to the indication information.

18 Claims, 17 Drawing Sheets

(56) References Cited

U.S. PATENT DOCUMENTS

| | | |
|---|---|---|
| 2007/0280170 A1 | 12/2007 | Kawasaki |
| 2010/0216497 A1 | 8/2010 | Kawasaki |
| 2011/0222451 A1 | 9/2011 | Peisa |
| 2012/0252442 A1 | 10/2012 | Fu |
| 2013/0190024 A1 | 7/2013 | Hayase et al. |
| 2014/0119332 A1 | 5/2014 | Kim et al. |
| 2014/0211694 A1 | 7/2014 | He et al. |
| 2014/0301315 A1 | 10/2014 | Wang et al. |
| 2015/0245365 A1* | 8/2015 | Isokangas ............ H04L 5/0096 455/423 |
| 2015/0282200 A1 | 10/2015 | Lee et al. |
| 2016/0302209 A1* | 10/2016 | Behravan ............ H04L 5/0066 |
| 2016/0345356 A1* | 11/2016 | Lindoff ................ H04W 72/14 |
| 2017/0070902 A1 | 3/2017 | Fukuta |
| 2017/0188372 A1 | 6/2017 | Reis et al. |
| 2017/0245199 A1 | 8/2017 | Lee et al. |
| 2017/0339671 A1* | 11/2017 | Lee ...................... H04W 72/12 |
| 2019/0053292 A1* | 2/2019 | Ali ....................... H04W 76/16 |
| 2020/0119764 A1 | 4/2020 | Zhou |
| 2020/0154442 A1 | 5/2020 | Zhou |

FOREIGN PATENT DOCUMENTS

| | | |
|---|---|---|
| CN | 101116365 A | 1/2008 |
| CN | 102176692 A | 9/2011 |
| CN | 103228050 A | 7/2013 |
| CN | 104703283 A | 6/2015 |
| CN | 104735729 A | 6/2015 |
| CN | 105282723 A | 1/2016 |
| CN | 106612553 A | 5/2017 |
| EP | 3651529 A1 | 5/2020 |
| EP | 3651530 A1 | 5/2020 |
| WO | 2010126112 A1 | 11/2010 |
| WO | 2014050393 A1 | 4/2014 |

OTHER PUBLICATIONS

Supplementary European Search Report in the European application No. 17928348.6, dated May 4, 2021.

International Search Report in the international application No. PCT/CN2017/105750, dated Jun. 28, 2018.

English translation of the Written Opinion of the International Search Authority in the international application No. PCT/CN2017/105750, dated Jun. 28, 2018.

\* cited by examiner

COMMUNICATION CONTROL METHOD AND COMMUNICATION CONTROL DEVICE

CROSS-REFERENCE TO RELATED APPLICATION

The present application is a continuation of International Application No. PCT/CN2017/105750 filed on Oct. 11, 2017, the disclosure of which is hereby incorporated by reference in its entirety.

BACKGROUND

With the development of communication technologies, User Equipment (UE) may not only communicate with a base station via a Long-Term Evolution (LTE) communication link but also communicate with the base station via a New Radio (NR) communication link. For example, the UE may transmit signals on different bands of the two communication links.

SUMMARY

The present application generally relates to the technical field of communication, and more particularly, to a method for communication control and a device for communication control.

The present disclosure provides a method for communication control, a device for communication control, an electronic device and a computer-readable storage medium, to overcome the shortcomings in the related art.

According to a first aspect of embodiments of the present disclosure, there is provided a method for communication control, which may include that:

indication information which is related to uplink transmission denial information and is sent by a first base station is received;

a communication resource corresponding to the uplink transmission denial information is determined; and transmission of uplink information via the communication resource is denied according to the indication information.

According to a second aspect of the embodiments of the present disclosure, there is provided a device for communication control, which may include:

a processor; and memory storing instructions for execution by the processor, herein the processor is configured to:

receive indication information which is related to uplink transmission denial information and is sent by a first base station;

determine a communication resource corresponding to the uplink transmission denial information; and deny the transmission of uplink information via the communication resource according to the indication information.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
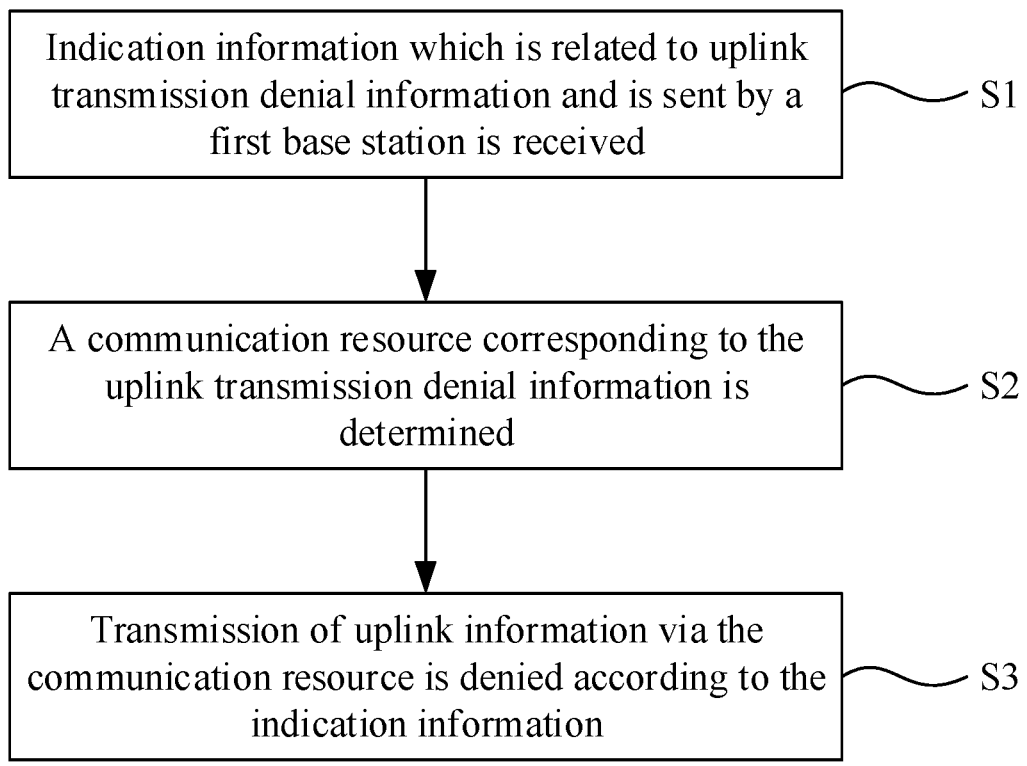
FIG. 1 is a flowchart showing a method for communication control, according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure.

Rather, they are merely examples of the apparatus and method in accordance with certain aspects herein as recited in the accompanying claims.

The technical solutions in some embodiments of the present application will be clearly and completely described below in combination with the accompanying drawings in the embodiments of the present application. It is apparent that the described embodiments are not all embodiments but only part of embodiments of the present application. All other embodiments obtained by those of ordinary skill in the art based on the embodiments in the present application without creative work shall fall within the scope of protection of the present application.

When a UE transmits uplink signals on different bands, it may cause serious intermodulation distortion to downlink signals reception on a certain band, and thus reduce signal receiving performance of the UE. Intermodulation distortion can be reduced mainly by use of a filter. However, in one aspect, the adopted filter is expensive and costly, and in another aspect, the adopted filter may not completely eliminate the intermodulation distortion, which may still reduce signal receiving performance of UE to a certain extent.

FIG. 1 is a schematic flowchart showing a method for communication control, according to some embodiments of the present disclosure. The method for communication control of the embodiment may be applied to UE with a communication function, for example, a mobile phone, a tablet computer, a smart wearable device, other mobile terminals, etc. The UE may establish communication connections with multiple base stations at the same time, and communication protocols for different base stations of the multiple base stations and the UE may be different and may also be the same. For example, the UE in the embodiment may establish communication connections with a 4th-Generation (4G) base station and a 5th-Generation (5G) base station at the same time.

As shown in FIG. 1, the method for communication control of the embodiment may include the following steps.

In S1, indication information which is related to uplink transmission denial information and is sent by a first base station is received.

In an embodiment, the first base station may be a base station of multiple base stations capable of establishing communication connections with the UE. For example, if the UE may establish communication connections with a 4G base station and a 5G base station at the same time, the first base station may be the 4G base station and may also be the 5G base station.

In an embodiment, the indication information is related to an operation that the UE denies the uplink transmission information. For example, the indication information may be used to indicate that: UE denies the transmission of uplink information for the number of times; or the UE denies the transmission of uplink information for the duration; or the UE denies the transmission of uplink information for a specific communication link.

In an embodiment, uplink information may not only include data but also include signaling.

In an embodiment, the indication information may not only include data but also include signaling. For example, if the indication information includes signaling, the signaling may be Radio Resource Control (RRC) signaling, and may specifically be OtherConfig signaling in RRC connection reconfiguration signaling.

In S2, a communication resource corresponding to the uplink transmission denial information is determined.

In an embodiment, a process of the UE transmitting the uplink information, i.e., a process of transmitting information to a base station (which may be the first base station and may also be another base station capable of establishing a communication connection with the UE), requires a communication resource to be occupied. For example, a certain communication link is required to be occupied, or a certain communication frequency band is required to be occupied. The communication resource required to be occupied is the communication resource corresponding to the uplink transmission denial information.

In an embodiment, the UE may determine the communication resource corresponding to the uplink transmission denial information in multiple manners. For example, a communication resource corresponding to downlink information required to be received may be determined at first, and then the communication resource corresponding to the downlink information required to be received is determined as the communication resource corresponding to the uplink transmission denial information. For example, the indication information sent by the first base station may be parsed to extract the communication resource corresponding to the uplink transmission denial information from the indication information.

In S3, the transmission of uplink information via the communication resource is denied according to the indication information.

In an embodiment, the indication information which is related to uplink transmission denial information and is sent by a first base station is received; and after the communication resource corresponding to the uplink transmission denial information is determined, the transmission of uplink information via the communication resource may be denied according to the indication information. Therefore, the circumstance that the UE transmits uplink information on the communication resource corresponding to the uplink transmission denial information when receiving the downlink information on the communication resource corresponding to the uplink transmission denial information is avoided, the intermodulation distortion to the process of receiving downlink information is avoided, and signal receiving performance of the UE is further ensured.

Figure 2A:
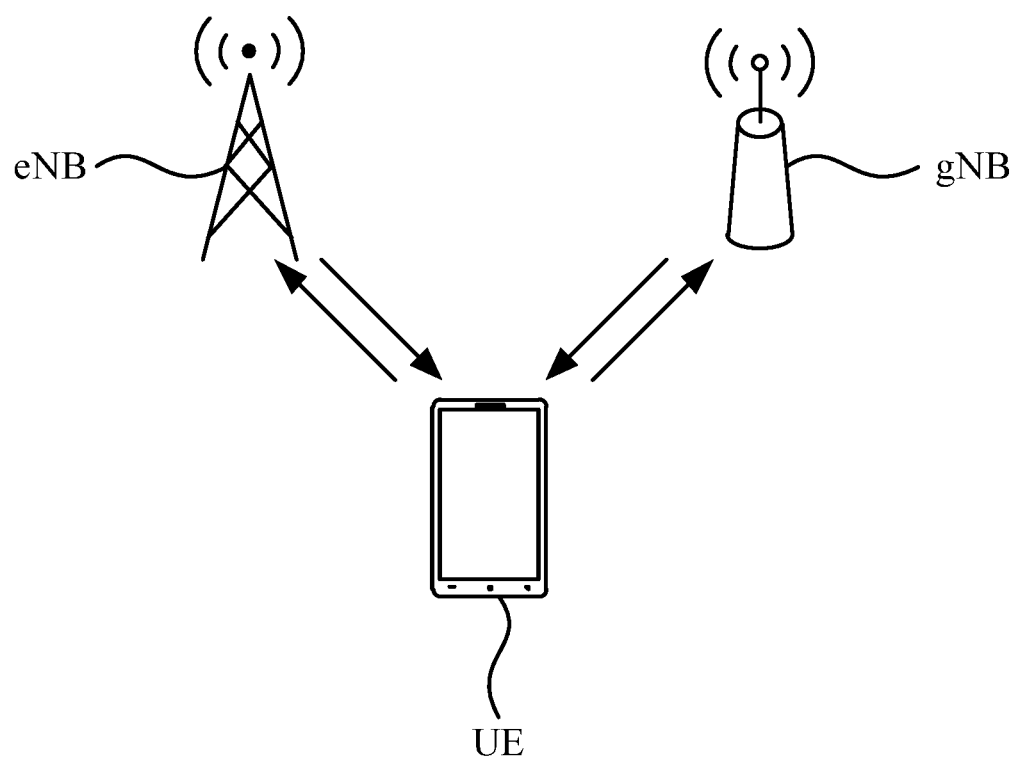
FIG. 2A is a first schematic diagram illustrating an application scenario of a method for communication control, according to some embodiments of the present disclosure.
Figure 2B:
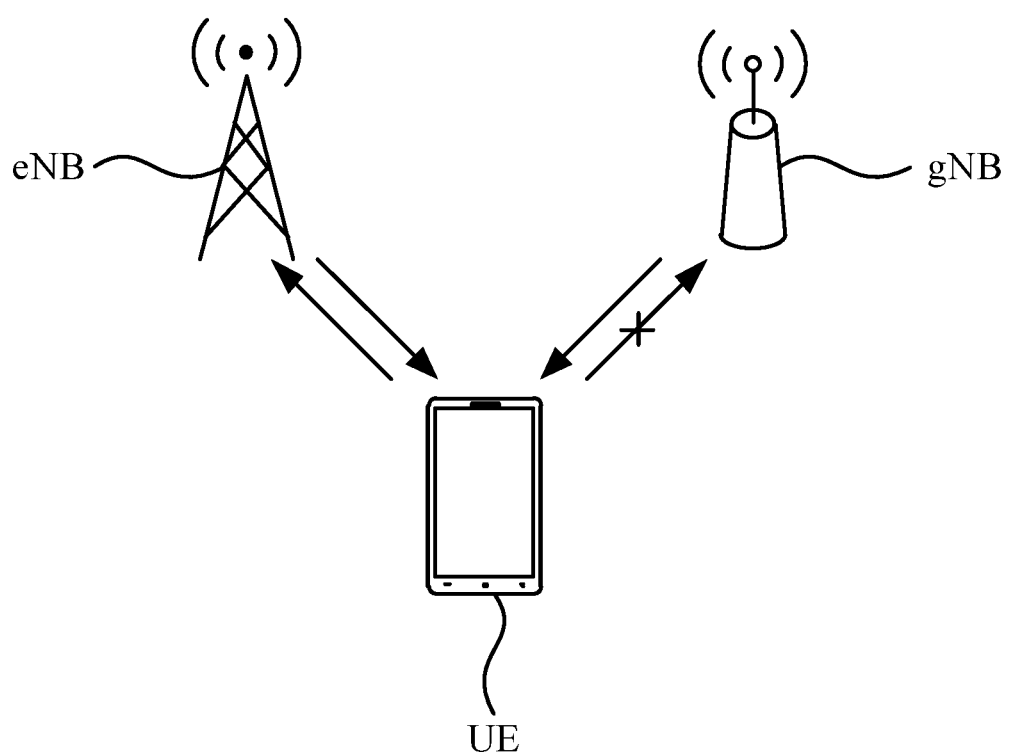
FIG. 2B is a second schematic diagram illustrating an application scenario of a method for communication control, according to some embodiments of the present disclosure.

FIG. 2A and FIG. 2B are schematic diagrams illustrating an application scenario of a method for communication control, according to some embodiments of the present disclosure.

As shown in FIG. 2A, the UE establishes communication connections with the 4G eNB and the 5G gNB, may not only receive downlink information transmitted by the 4G eNB but also receive downlink information transmitted by the 5G gNB, and may not only transmit uplink information to the 4G eNB but also transmit uplink information to the 5G gNB.

As shown in FIG. 2B, the UE may receive indication information which is related to uplink transmission denial information and is sent by a 4G eNB and determine a communication resource corresponding to the uplink transmission denial information. For example, the indication information includes a preset duration, and the communication resource corresponding to the uplink transmission denial information includes a communication link between the UE and the 5G base station. In such case, the UE may deny the transmission of uplink information on the communication link with the 5G base station for the preset duration, thereby avoiding a intermodulation distortion of a process of transmitting the uplink information via the communication link with the 5G base station to a process of receiving the downlink information via the communication link with the 5G base station and further ensuring signal receiving performance of the UE.

Figure 3:
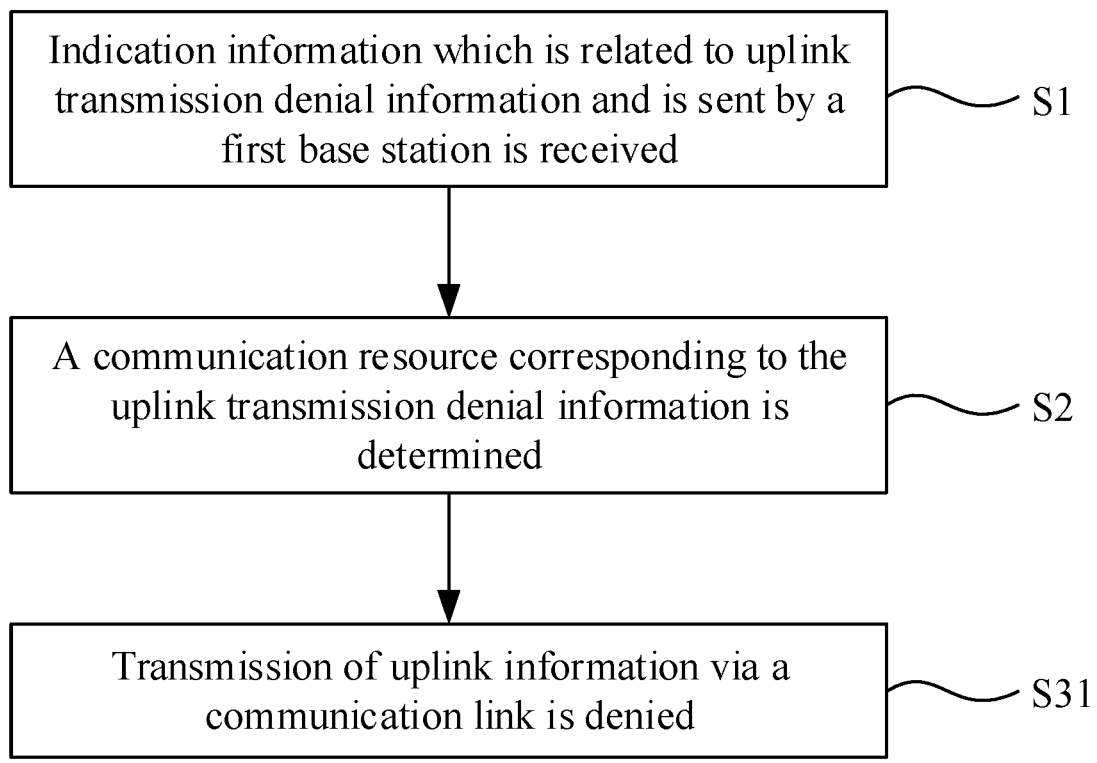
FIG. 3 is a schematic flowchart showing another method for communication control, according to some embodiments of the present disclosure.

FIG. 3 is a schematic flowchart showing another method for communication control, according to some embodiments of the present disclosure. As shown in FIG. 3, based on the embodiment shown in FIG. 1, the communication resource includes a communication link, and the operation that the transmission of uplink information via the communication resource is denied includes the following step.

In S31, the transmission of uplink information via the communication link is denied.

In an embodiment, the communication resource corresponding to the uplink transmission denial information may include the communication link, and denying the transmission of uplink information via the communication link may avoid a intermodulation distortion to a process of receiving downlink information via the communication link and further ensure the signal receiving performance of the UE.

Figure 4:
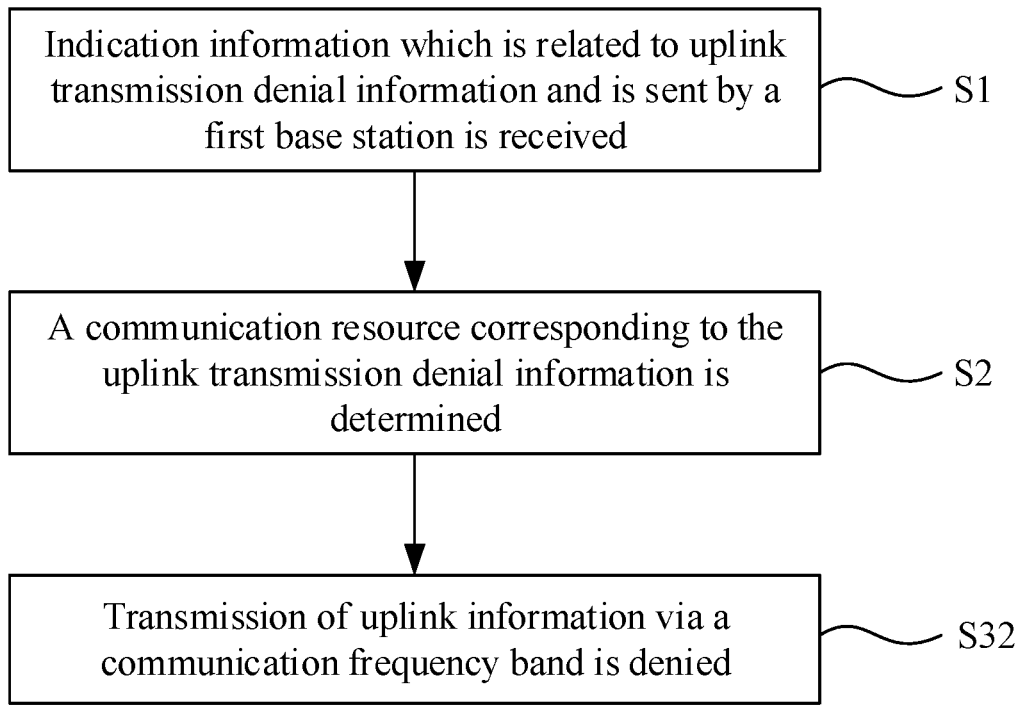
FIG. 4 is a schematic flowchart showing another method for communication control, according to some embodiments of the present disclosure.

FIG. 4 is a schematic flowchart showing another method for communication control, according to some embodiments of the present disclosure. As shown in FIG. 4, based on the embodiment shown in FIG. 1, the communication resource includes a communication frequency band, and the operation that the transmission of uplink information via the communication resource is denied includes the following step.

In S32, the transmission of uplink information via the communication frequency band is denied.

In an embodiment, the communication resource corresponding to the uplink transmission denial information may include the communication frequency band, and denying the transmission of uplink information via the communication frequency band may avoid intermodulation distortion to a process of receiving the downlink information via the communication frequency band and further ensure the signal receiving performance of the UE.

Figure 5:
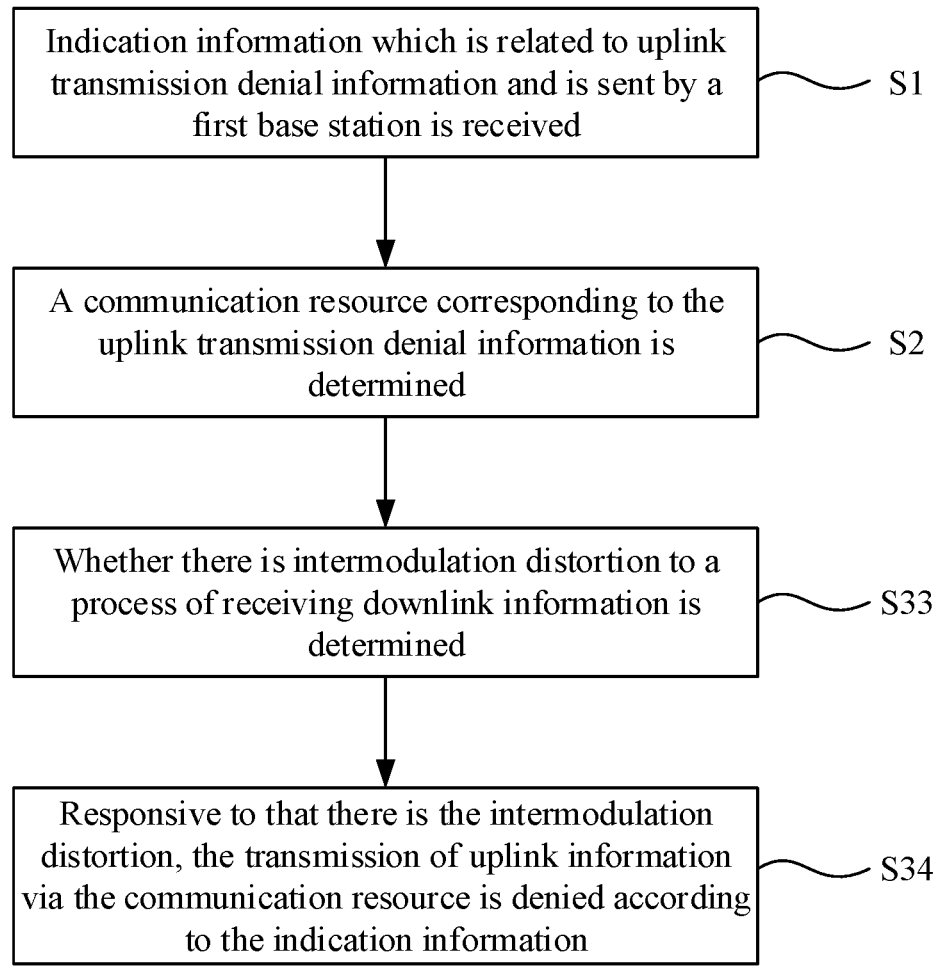
FIG. 5 is a schematic flowchart showing another method for communication control, according to some embodiments of the present disclosure.

FIG. 5 is a schematic flowchart showing another method for communication control, according to some embodiments of the present disclosure. As shown in FIG. 5, based on the embodiment shown in FIG. 1, the operation that the transmission of uplink information via the communication resource is denied according to the indication information includes the following steps.

In S33, whether there is intermodulation distortion to a process of receiving downlink information is determined.

In S34, responsive to that there is the intermodulation distortion, the transmission of uplink information via the communication resource is denied according to the indication information.

In an embodiment, the downlink information may not only include data but also include signaling. The downlink information may be information transmitted to the UE by a base station capable of establishing a communication connection with the UE.

In an embodiment, the UE, after determining the communication resource corresponding to the uplink transmission denial information, may determine whether there is intermodulation distortion to the process of receiving downlink information. For example, whether there is intermodulation distortion to a process of receiving the downlink information via the communication resource corresponding to the uplink transmission denial information may be determined. Under the circumstance that it is determined that there is intermodulation distortion, the transmission of uplink information via the communication resource is denied according to the indication information. If there is no intermodulation distortion, the transmission of uplink information via the communication resource may not be denied according to the indication information.

Accordingly, the phenomenon that the UE denies the transmission of uplink information via the communication resource under the circumstance that there is no intermodulation distortion to the process of UE receiving downlink information may be avoided, and it may be ensured that the UE may smoothly transmit uplink information via the communication resource without intermodulation distortion to the process of UE receiving downlink information.

Figure 6:
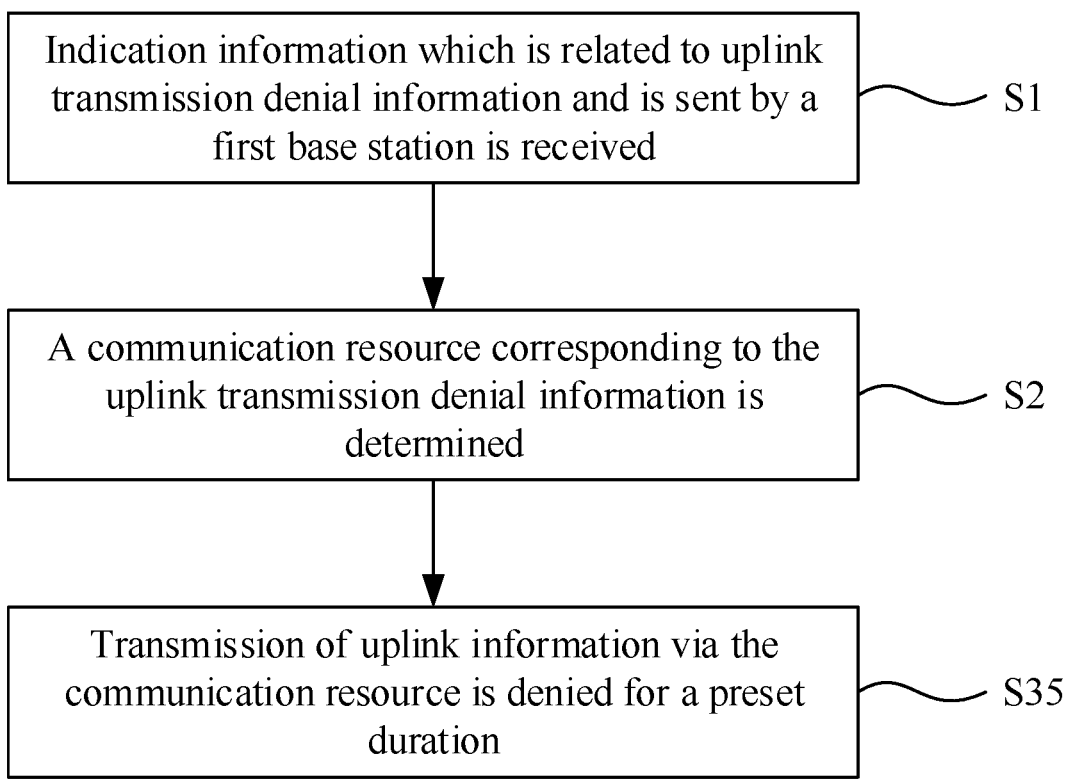
FIG. 6 is a schematic flowchart showing another method for communication control, according to some embodiments of the present disclosure.

FIG. 6 is a schematic flowchart showing another method for communication control, according to some embodiments of the present disclosure. As shown in FIG. 6, based on the embodiment shown in FIG. 1, the indication information includes a preset duration, and the operation that the transmission of uplink information via the communication resource is denied includes the following step.

In S35, the transmission of uplink information via the communication resource is denied for the preset duration.

In an embodiment, the indication information may include the preset duration, and the UE may start denying the transmission of uplink information via the communication resource for the preset duration after S2 is executed or when it is determined that there is intermodulation distortion, to avoid intermodulation distortion of the process of transmitting the uplink information via the communication resource to the process of receiving downlink information.

The preset duration may be a duration of the process of receiving downlink information, so that starting denying the transmission of uplink information via the communication resource for the preset duration when it is determined that there is intermodulation distortion may avoid the intermodulation distortion of the process of transmitting the uplink information via the communication resource to the process of receiving downlink information.

Figure 7:
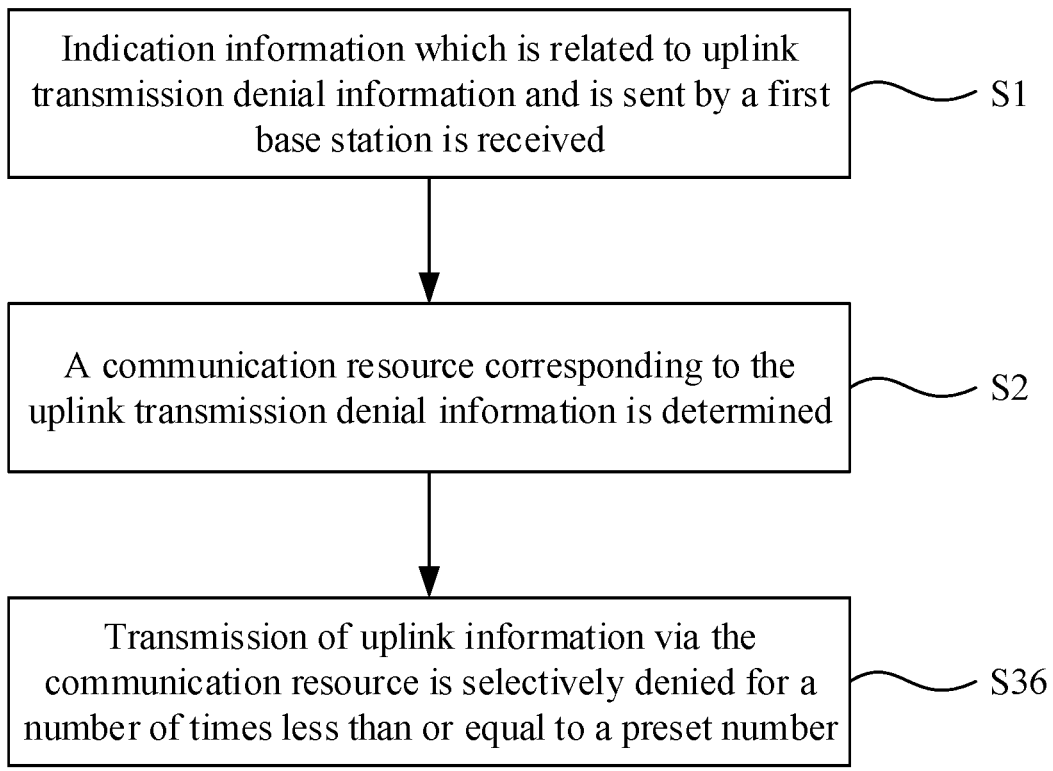
FIG. 7 is a schematic flowchart showing another method for communication control, according to some embodiments of the present disclosure.

FIG. 7 is a schematic flowchart showing another method for communication control, according to some embodiments of the present disclosure. As shown in FIG. 7, based on the embodiment shown in FIG. 1, the indication information includes a preset number, and the operation that the transmission of uplink information via the communication resource is denied includes the following step.

In S36, the transmission of uplink information via the communication resource is selectively denied for a number of times less than or equal to the preset number.

In an embodiment, the indication information may include the preset number, and the UE may start denying the transmission of uplink information via the communication resource after S2 is executed or when it is determined that there is intermodulation distortion, herein the number of denial times are less than or equal to the preset number, to avoid the intermodulation distortion of the process of transmitting the uplink information via the communication resource to the process of receiving downlink information.

The preset number may be the number of times for the processes of receiving downlink information, and the UE may start denying the transmission of uplink information via the communication resource after S2 is executed or when it is determined that there is intermodulation distortion, herein the number of denial times are less than or equal to the preset number, to avoid the intermodulation distortion of the process of transmitting the uplink information through the communication resource to each process of receiving downlink information of the UE.

Figure 8:
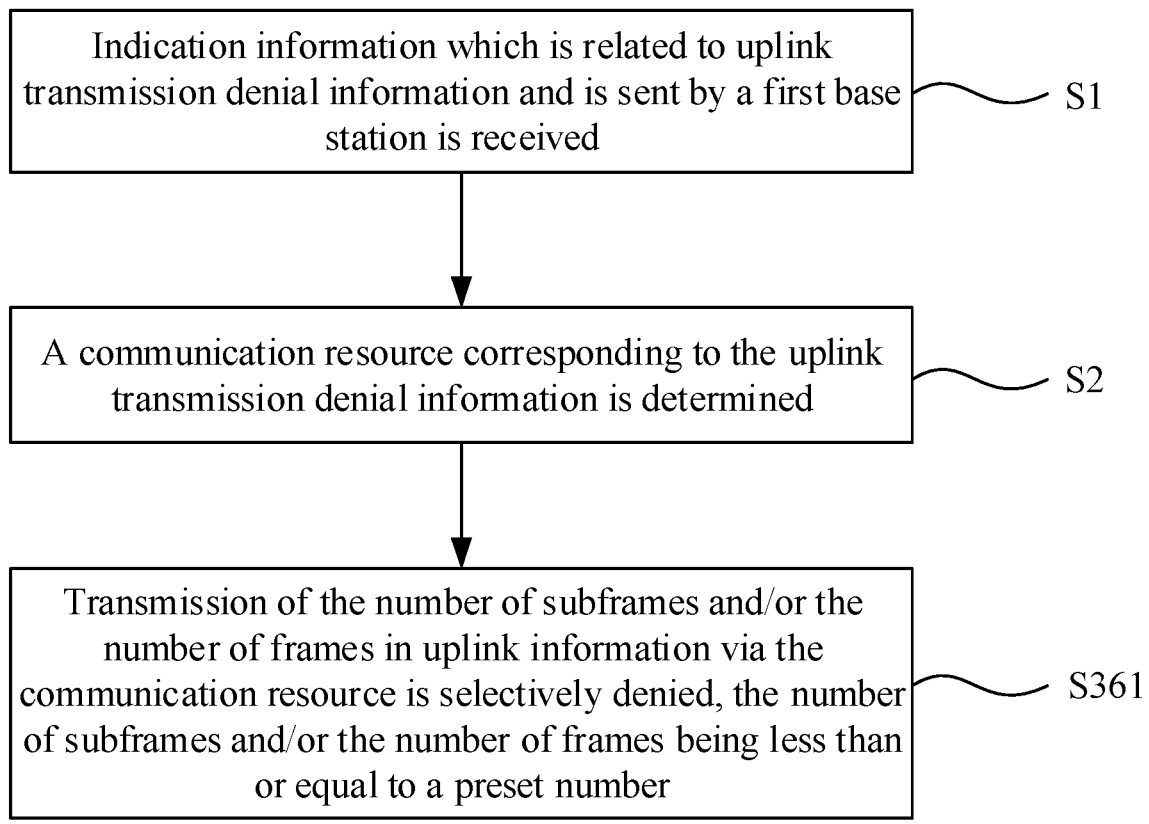
FIG. 8 is a schematic flowchart showing another method for communication control, according to some embodiments of the present disclosure.

FIG. 8 is a schematic flowchart showing another method for communication control, according to some embodiments of the present disclosure. As shown in FIG. 8, based on the embodiment shown in FIG. 7, the preset number is a number of subframes and/or a number of frames, and the operation that the transmission of uplink information via the communication resource is denied includes the following step.

In S361, the transmission of the number of subframes and/or the number of frames in uplink information via the communication resource is selectively denied, herein the number of subframes and/or the number of frames are less than or equal to the preset number.

In an embodiment, the preset number may specifically be the number of subframes or the number of frames. Subframe and frame are units for data transmission between UE and a base station. Therefore, accordingly setting the preset number is favorable for conveniently dividing each process of denying the transmission of uplink information via the communication resource based on the units.

Figure 9:
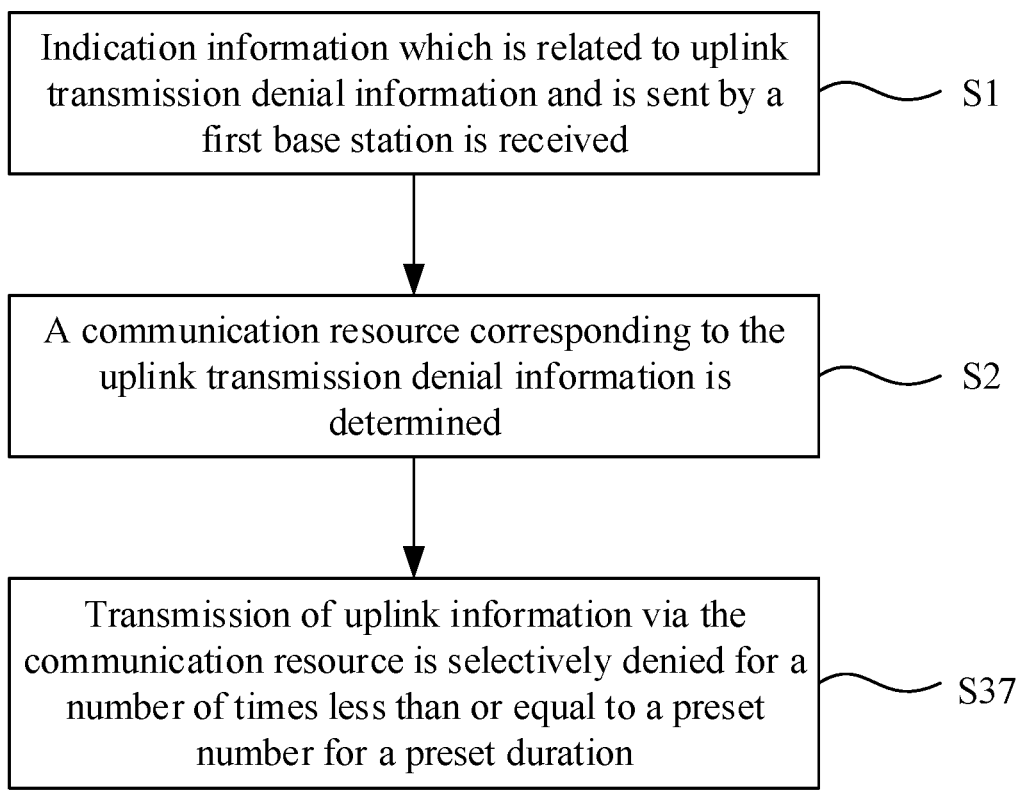
FIG. 9 is a schematic flowchart showing another method for communication control, according to some embodiments of the present disclosure.

FIG. 9 is a schematic flowchart showing another method for communication control, according to some embodiments of the present disclosure. As shown in FIG. 9, based on the embodiment shown in FIG. 1, the indication information includes the preset duration and the preset number, and the operation that the transmission of uplink information via the communication resource is denied includes the following step.

In S37, the transmission of uplink information via the communication resource is selectively denied for a number of times less than or equal to the preset number for the preset duration.

In an embodiment, the embodiments shown in FIG. 6 and FIG. 7 may be combined to determine how to deny the transmission of uplink information via the communication resource from multiple dimensions.

In an embodiment, "selectively" mentioned in the embodiments shown in FIG. 6 to FIG. 9 refers to that the UE may set a denial opportunity according to a requirement. For example, when the downlink information is required to be received, the process of denying the transmission of uplink information via the communication resource in the abovementioned embodiments may be executed. For another example, for uplink information corresponding to a preset subframe or frame, the process of denying the transmission of uplink information via the communication resource in the abovementioned embodiments may be executed.

Figure 10:
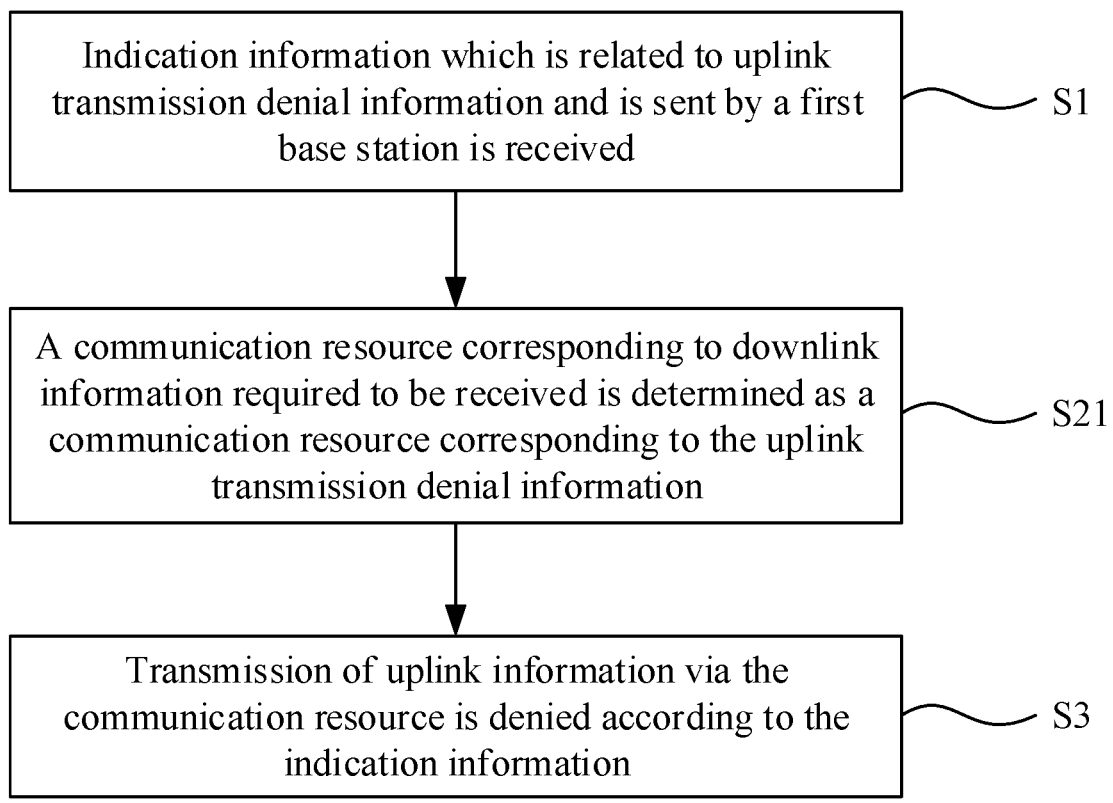
FIG. 10 is a schematic flowchart showing another method for communication control, according to some embodiments of the present disclosure.

FIG. 10 is a schematic flowchart showing another method for communication control, according to some embodiments of the present disclosure. As shown in FIG. 10, based on the embodiment shown in FIG. 1, the operation that the communication resource corresponding to the uplink transmission denial information is determined includes the following step.

In S21, a communication resource corresponding to downlink information required to be received is determined as the communication resource corresponding to the uplink transmission denial information.

In an embodiment, the UE may determine the communication resource corresponding to the downlink information required to be received as the communication resource corresponding to the uplink transmission denial information. For example, the UE determines the communication resource corresponding to the downlink information required to be received as the communication link between the UE and the 5G base station, and in such case, the communication link between the UE and the 5G base station may be determined as the communication resource corresponding to the uplink transmission denial information.

Furthermore, subsequently denying the transmission of uplink information via the communication resource may avoid intermodulation distortion of the process of transmitting the uplink information through the communication link with the 5G base station to the process corresponding to the downlink information received by the UE through the communication link with the 5G base station.

Figure 11:
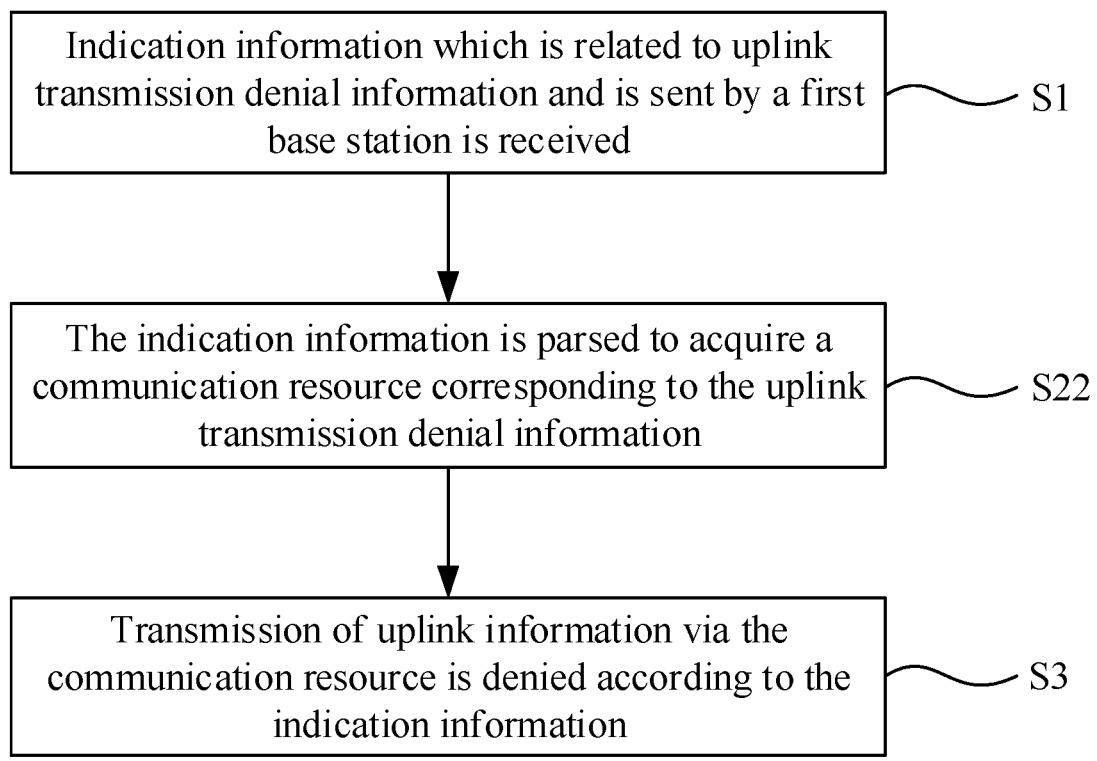
FIG. 11 is a schematic flowchart showing another method for communication control, according to some embodiments of the present disclosure.

FIG. 11 is a schematic flowchart showing another method for communication control, according to some embodiments of the present disclosure. As shown in FIG. 11, based on the embodiment shown in FIG. 1, the operation that the communication resource corresponding to the uplink transmission denial information is determined includes the following step.

In S22, the indication information is parsed to acquire the communication resource corresponding to the uplink transmission denial information.

In an embodiment, the communication resource corresponding to the uplink transmission denial information may be set by the first base station and transmitted to the UE through the indication information. The UE may parse the indication information to acquire the communication resource corresponding to the uplink transmission denial information.

Corresponding to the above embodiments of the method for communication control, the present disclosure also provides embodiments of a device for communication control.

Figure 12:
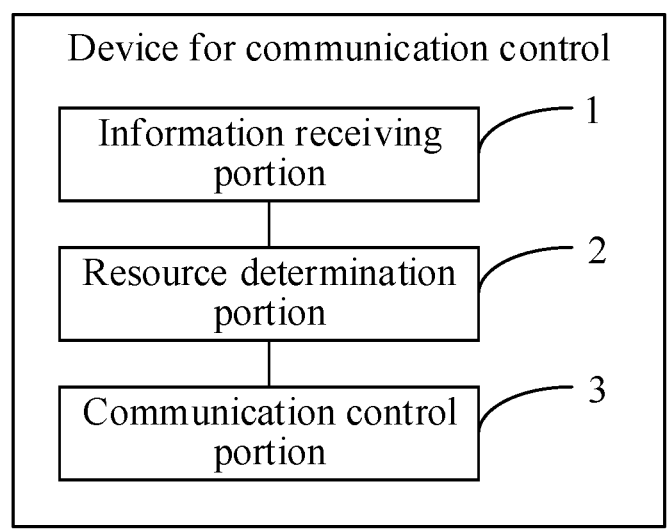
FIG. 12 is a schematic block diagram of a device for communication control, according to some embodiments of the present disclosure.

FIG. 12 is a schematic block diagram of a device for communication control, according to some embodiments of the present disclosure. As shown in FIG. 12, the device for communication control includes:

an information receiving portion 1, configured to receive indication information which is related to uplink transmission denial information and is sent by a first base station;

a resource determination portion 2, configured to determine a communication resource corresponding to the uplink transmission denial information; and a communication control portion 3, configured to deny the transmission of uplink information via the communication resource according to the indication information.

Figure 13:
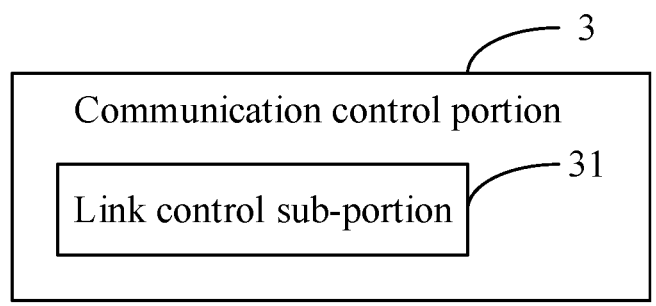
FIG. 13 is a schematic block diagram of a communication control portion, according to some embodiments of the present disclosure.

FIG. 13 is a schematic block diagram of a communication control portion, according to some embodiments of the present disclosure. As shown in FIG. 13, based on the embodiment shown in FIG. 12, the communication resource includes a communication link, and the communication control portion 3 includes:

a link control sub-portion 31, configured to deny the transmission of uplink information via the communication link.

Figure 14:
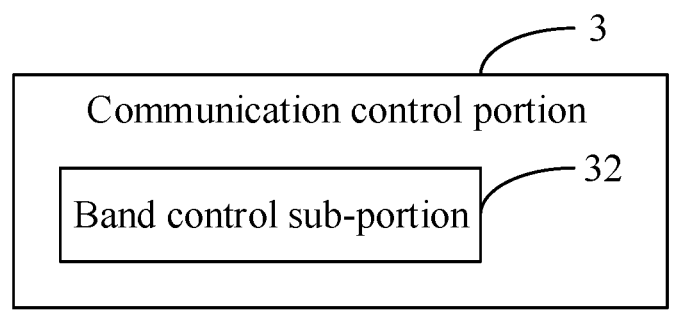
FIG. 14 is a schematic block diagram of another communication control module, according to some embodiments of the present disclosure.

FIG. 14 is a schematic block diagram of another communication control portion, according to some embodiments of the present disclosure. As shown in FIG. 14, based on the embodiment shown in FIG. 12, the communication resource includes a communication frequency band, and the communication control portion 3 includes:

a band control sub-portion 32, configured to deny the transmission of uplink information via the communication frequency band.

Figure 15:
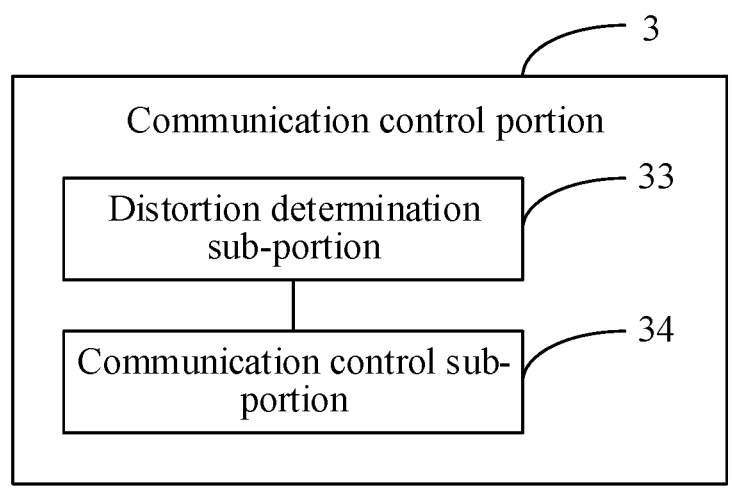
FIG. 15 is a schematic block diagram of another communication control portion, according to some embodiments of the present disclosure.

FIG. 15 is a schematic block diagram of another communication control portion, according to some embodiments of the present disclosure. As shown in FIG. 15, based on the embodiment shown in FIG. 12, the communication control portion 3 includes:

a distortion determination sub-portion 33, configured to determine whether there is intermodulation distortion to a process of receiving downlink information; and a communication control sub-portion 34, configured to, under the circumstance that the distortion determination sub-portion 33 determines that there is the intermodulation distortion, deny the transmission of uplink information via the communication resource according to the indication information.

In some embodiments, the indication information includes a preset duration, and the communication control sub-portion is configured to deny the transmission of uplink information via the communication resource for the preset duration.

In some embodiments, the indication information may include a preset number, and the communication control sub-portion is configured to selectively deny the transmission of uplink information via the communication resource for a number of times less than or equal to the preset number.

In some embodiments, the preset number is a number of subframes and/or a number of frames, and the communication control sub-portion is configured to selectively deny the transmission of the number of subframes and/or the number of frames in uplink information via the communication resource, herein the number of subframes and/or the number of frames are less than or equal to the preset number.

In some embodiments, the indication information includes the preset duration and the preset number, and the operation that the transmission of uplink information via the communication resource is denied includes that:

the transmission of uplink information via the communication resource is selectively denied for a number of times less than or equal to the preset number for the preset duration.

In some embodiments, the resource determination portion is configured to determine a communication resource corresponding to downlink information required to be received as the communication resource corresponding to the uplink transmission denial information.

In some embodiments, the resource determination portion is configured to parse the indication information to acquire the communication resource corresponding to the uplink transmission denial information.

With respect to the device in the above embodiments, the specific manners for performing operations for individual portions therein have been described in detail in the embodiments regarding the methods, which will not be elaborated herein.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the portions therein may be selected according to a practical requirement to achieve the purpose of the solutions of the embodiments. Those of ordinary skill in the art may understand and implement without creative work.

The present disclosure also provides an electronic device, which includes:

a processor; and memory storing instructions for execution by the processor, therein the processor is configured to:

receive indication information which is related to uplink transmission denial information and is sent by a first base station;

determine a communication resource corresponding to the uplink transmission denial information; and deny the transmission of uplink information via the communication resource according to the indication information.

The present disclosure also provides a computer-readable storage medium having stored therein computer programs that, when being executed by a processor, implement the following steps:

indication information which is related to uplink transmission denial information and is sent by a first base station is received;

a communication resource corresponding to the uplink transmission denial information is determined; and the transmission of uplink information via the communication resource is denied according to the indication information.

Figure 16:
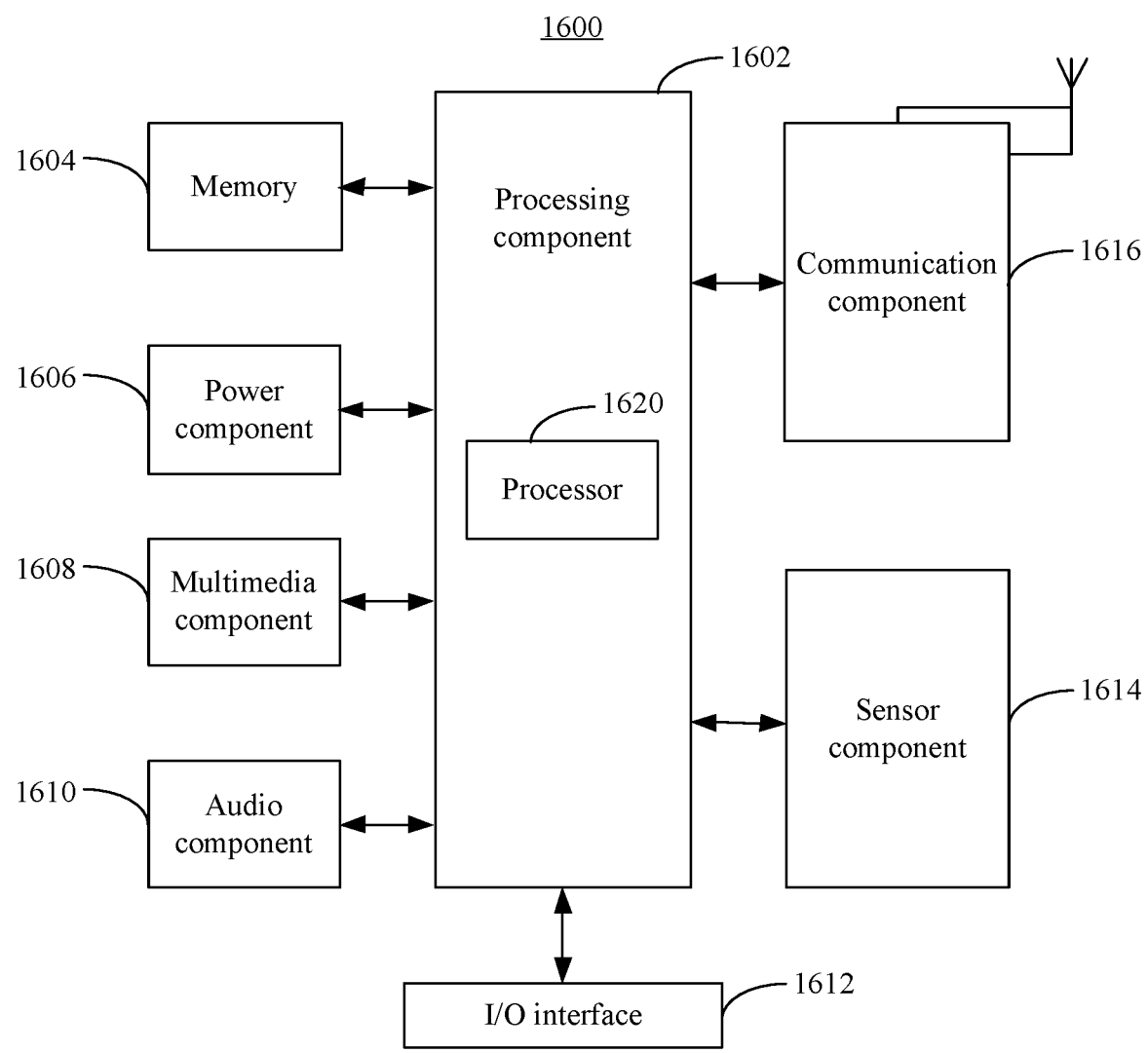
FIG. 16 is a schematic block diagram of a device for communication control, according to some embodiments of the present disclosure.

FIG. 16 is a schematic block diagram of a device 1600 for communication control, according to some embodiments of the present disclosure. For example, the device 1600 may be a mobile phone, a computer, a digital broadcast terminal, a messaging device, a gaming console, a tablet, a medical device, exercise equipment, a personal digital assistant and the like.

Referring to FIG. 16, the device 1600 may include one or more of the following components: a processing component 1602, a memory 1604, a power component 1606, a multimedia component 1608, an audio component 1610, an Input/Output (I/O) interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions to perform all or part of the steps in the abovementioned method. Moreover, the processing component 1602 may include one or more portions which facilitate interaction between the processing component 1602 and the other components. For instance, the processing component 1602 may include a multimedia portion to facilitate interaction between the multimedia component 1608 and the processing component 1602.

The memory 1604 is configured to store various types of data to support the operation of the device 1600. Examples of such data include instructions for any application programs or methods operated on the device 1600, contact data, phonebook data, messages, pictures, video, etc. The memory 1604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1606 provides power for various components of the device 1600. The power component 1606 may include a power management system, one or more power supplies, and other components associated with generation, management and distribution of power for the device 1600.

The multimedia component 1608 includes a screen providing an output interface between the device 1600 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1608 includes a front camera and/or a rear camera. The front camera and/or the rear camera may receive external multimedia data when the device 1600 is in an operation mode, such as a photographing mode or a video mode. Each of the front camera and the rear camera may be a fixed optical lens system or have focusing and optical zooming capabilities.

The audio component 1610 is configured to output and/or input an audio signal. For example, the audio component 1610 includes a Microphone (MIC), and the MIC is configured to receive an external audio signal when the device 1600 is in the operation mode, such as a call mode, a recording mode and a voice recognition mode. The received audio signal may further be stored in the memory 1604 or sent through the communication component 1616. In some embodiments, the audio component 1610 further includes a speaker configured to output the audio signal.

The I/O interface 1612 provides an interface between the processing component 1602 and a peripheral interface portion, and the peripheral interface portion may be a keyboard, a click wheel, a button and the like. The button may include, but not limited to: a home button, a volume button, a starting button and a locking button.

The sensor component 1614 includes one or more sensors configured to provide status assessment in various aspects for the device 1600. For instance, the sensor component 1614 may detect an on/off status of the device 1600 and relative positioning of components, such as a display and small keyboard of the device 1600, and the sensor component 1614 may further detect a change in a position of the device 1600 or a component of the device 1600, presence or absence of contact between the user and the device 1600, orientation or acceleration/deceleration of the device 1600 and a change in temperature of the device 1600. The sensor component 1614 may include a proximity sensor configured to detect presence of an object nearby without any physical contact. The sensor component 1614 may also include a light sensor, such as a Complementary Metal Oxide Semiconductor (CMOS) or Charge Coupled Device (CCD) image sensor, configured for use in an imaging application. In some embodiments, the sensor component 1614 may also include an acceleration sensor, a gyroscope sensor, a magnetic sensor, a pressure sensor or a temperature sensor.

The communication component 1616 is configured to facilitate wired or wireless communication between the device 1600 and another device. The device 1600 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 1616 receives a broadcast signal or broadcast associated information from an external broadcast management system through a broadcast channel. In some embodiments of the present disclosure, the communication component 1616 further includes a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method in the abovementioned embodiments.

In some embodiments of the present disclosure, there is also provided a non-transitory computer-readable storage medium including an instruction, such as the memory 1604 including an instruction, and the instruction may be executed by the processor 1620 of the device 1600 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for communication control, comprising:
receiving indication information which is related to uplink transmission denial information and is sent by a first base station;
determining a communication resource corresponding to the uplink transmission denial information; and
denying transmission of uplink information via the communication resource according to the indication information;
wherein the communication resource comprises a communication link;
wherein the denying the transmission of uplink information via the communication resource according to the indication information comprises:
determining whether there is intermodulation distortion to a process of receiving downlink information; and
responsive to that there is the intermodulation distortion, denying the transmission of uplink information via the communication resource according to the indication information.

2. The method of claim 1, wherein the denying the transmission of uplink information via the communication resource comprises:
denying the transmission of uplink information via the communication link.

3. The method of claim 1, wherein the communication resource comprises a communication frequency band, and the denying the transmission of uplink information via the communication resource comprises:
denying the transmission of uplink information via the communication frequency band.

4. The method of claim 1, wherein the indication information comprises a preset duration, and denying the transmission of uplink information via the communication resource comprises:
denying the transmission of uplink information via the communication resource for the preset duration.

5. The method of claim 1, wherein the indication information comprises a preset number, and denying the transmission of uplink information via the communication resource comprises:
   selectively denying the transmission of uplink information via the communication resource for a number of times less than or equal to the preset number.

6. The method of claim 5, wherein the preset number is a number of subframes and/or a number of frames, and denying the transmission of uplink information via the communication resource comprises:
   selectively denying the transmission of the number of subframes and/or the number of frames in uplink information via the communication resource, the number of subframes and/or the number of frames being less than or equal to the preset number.

7. The method of claim 1, wherein the indication information comprises a preset duration and a preset number, and denying the transmission of uplink information via the communication resource comprises:
   selectively denying the transmission of uplink information via the communication resource for a number of times less than or equal to the preset number for the preset duration.

8. The method of claim 1, wherein the determining the communication resource corresponding to the uplink transmission denial information comprises:
   determining a communication resource corresponding to downlink information required to be received as the communication resource corresponding to the uplink transmission denial information.

9. The method of claim 1, wherein the determining the communication resource corresponding to the uplink transmission denial information comprises:
   parsing the indication information to acquire the communication resource corresponding to the uplink transmission denial information.

10. A device for communication control, comprising:
    a processor; and
    memory storing instructions for execution by the processor,
    wherein the processor is configured to:
    receive indication information which is related to uplink transmission denial information and is sent by a first base station;
    determine a communication resource corresponding to the uplink transmission denial information; and
    deny transmission of uplink information via the communication resource according to the indication information;
    wherein the communication resource comprises a communication link;
    wherein the processor is further configured to:
    determine whether there is intermodulation distortion to a process of receiving downlink information; and
    under a circumstance that the processor determines that there is the intermodulation distortion, deny the transmission of uplink information via the communication resource according to the indication information.

11. The device of claim 10, wherein the processor is further configured to:
    deny the transmission of uplink information via the communication link.

12. The device of claim 10, wherein the communication resource comprises a communication frequency band, and the processor is further configured to:
    deny the transmission of uplink information via the communication frequency band.

13. The device of claim 10, wherein the indication information comprises a preset duration, and the processor is further configured to deny the transmission of uplink information via the communication resource for the preset duration.

14. The device of claim 10, wherein
    the indication information comprises a preset number, and the processor is further configured to selectively deny the transmission of uplink information via the communication resource for a number of times less than or equal to the preset number; and
    the preset number is a number of subframes and/or a number of frames, and the processor is further configured to selectively deny the transmission of the number of subframes and/or the number of frames in uplink information via the communication resource, the number of subframes and/or the number of frames being less than or equal to the preset number.

15. The device of claim 10, wherein the indication information comprises a preset duration and a preset number, and the processor is further configured to selectively deny the transmission of uplink information via the communication resource for a number of times less than or equal to the preset number for the preset duration.

16. The device of claim 10, wherein the processor is further configured to determine a communication resource corresponding to downlink information required to be received as the communication resource corresponding to the uplink transmission denial information.

17. The device of claim 10, wherein the processor is further configured to parse the indication information to acquire the communication resource corresponding to the uplink transmission denial information.

18. A mobile terminal implementing the method of claim 1, wherein the mobile terminal is configured to:
    establish communication connections with a 4th-Generation (4G) base station and a 5th-Generation (5G) base station;
    avoid a situation that the mobile terminal transmits the uplink information on the communication resource corresponding to the uplink transmission denial information when receiving downlink information on the communication resource corresponding to the uplink transmission denial information;
    reduce intermodulation distortion to the receiving downlink information; and
    thereby improve signal receiving performance.

* * * * *